United States Patent
Lessing et al.

(10) Patent No.: US 10,173,328 B2
(45) Date of Patent: *Jan. 8, 2019

(54) SOFT ROBOTIC ACTUATORS AND METHODS OF MANUFACTURING THE SAME

(71) Applicant: Soft Robotics, Inc., Cambridge, MA (US)

(72) Inventors: Joshua Aaron Lessing, Cambridge, MA (US); Ryan Richard Knopf, Cambridge, MA (US); Carl Everett Vause, Concord, MA (US); Daniel Vincent Harburg, Brookline, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,966

(22) Filed: Mar. 23, 2016

(65) Prior Publication Data

US 2016/0279803 A1 Sep. 29, 2016

Related U.S. Application Data

(60) Provisional application No. 62/137,148, filed on Mar. 23, 2015.

(51) Int. Cl.
*B25J 15/00* (2006.01)
*B32B 3/18* (2006.01)
(Continued)

(52) U.S. Cl.
CPC .......... *B25J 15/0023* (2013.01); *B25J 9/142* (2013.01); *B32B 3/10* (2013.01); *B32B 3/16* (2013.01);
(Continued)

(58) Field of Classification Search
CPC .... B25J 15/0009; B25J 9/142; B25J 15/0023; B25J 15/12; B66C 1/46
(Continued)

(56) References Cited

U.S. PATENT DOCUMENTS 4,751,869 A * 6/1988 Paynter .................. B29C 70/22
  92/103 F
4,815,782 A * 3/1989 Craig ........................ B25J 15/12
  294/119.3

(Continued)

FOREIGN PATENT DOCUMENTS

EP   0534778 A2 *  3/1993  ............. B25J 15/12
EP   1757818 A2    2/2007
(Continued)

OTHER PUBLICATIONS

Lining Yao, Ryuma Niiyama, Jifei Ou, Sean Follmer, Clark Della Silva, and Hiroshi Ishii. 2013. PneUI: pneumatically actuated soft composite materials for shape changing interfaces. In Proceedings of the 26th annual ACM symposium on (UIST '13). ACM, New York, (Year: 2013).*

(Continued)

*Primary Examiner* — Stephen A Vu

(57) ABSTRACT

Exemplary embodiments relate to various improvements in soft robotic actuators, and techniques for manufacturing the improvements. For example, techniques for manufacturing a rigidizing layer for reinforcing a soft robotic actuator is provided. In another embodiment, a soft robotic actuator having integrated sensors is described. A flexible electroadhesive pad for achieving a conformal grip is also described. Still further, exemplary embodiments provide hydraulically-actuated soft robotic grippers, which allows for a reduction in the size of the actuation system and improved underwater operation.

9 Claims, 16 Drawing Sheets

(51) Int. Cl.
B32B 5/02 (2006.01)
B32B 5/18 (2006.01)
B32B 27/40 (2006.01)
B32B 27/06 (2006.01)
B25J 9/14 (2006.01)
F15B 15/10 (2006.01)
B32B 38/10 (2006.01)
B32B 5/24 (2006.01)
B32B 5/26 (2006.01)
B32B 7/12 (2006.01)
B32B 27/12 (2006.01)
B32B 3/10 (2006.01)
B32B 3/16 (2006.01)
B32B 3/26 (2006.01)
B29C 65/18 (2006.01)
B29C 65/00 (2006.01)
B32B 38/00 (2006.01)
B32B 37/10 (2006.01)
B32B 37/06 (2006.01)
B32B 37/18 (2006.01)
B32B 37/04 (2006.01)
B32B 37/26 (2006.01)
B29C 65/48 (2006.01)
B29C 65/50 (2006.01)

(52) U.S. Cl.
CPC .............. *B32B 3/18* (2013.01); *B32B 3/266* (2013.01); *B32B 5/02* (2013.01); *B32B 5/18* (2013.01); *B32B 5/245* (2013.01); *B32B 5/26* (2013.01); *B32B 7/12* (2013.01); *B32B 27/065* (2013.01); *B32B 27/12* (2013.01); *B32B 27/40* (2013.01); *B32B 38/10* (2013.01); *F15B 15/103* (2013.01); *B29C 65/18* (2013.01); *B29C 65/4815* (2013.01); *B29C 65/5057* (2013.01); *B29C 66/1122* (2013.01); *B29C 66/3474* (2013.01); *B29C 66/433* (2013.01); *B29C 66/45* (2013.01); *B29C 66/71* (2013.01); *B29C 66/712* (2013.01); *B29C 66/727* (2013.01); *B29C 66/729* (2013.01); *B29C 66/7392* (2013.01); *B29C 66/8322* (2013.01); *B29C 66/91221* (2013.01); *B29C 66/91231* (2013.01); *B29C 2793/009* (2013.01); *B29C 2793/0009* (2013.01); *B32B 37/04* (2013.01); *B32B 37/06* (2013.01); *B32B 37/10* (2013.01); *B32B 37/182* (2013.01); *B32B 38/0004* (2013.01); *B32B 2037/268* (2013.01); *B32B 2250/03* (2013.01); *B32B 2262/0215* (2013.01); *B32B 2262/0253* (2013.01); *B32B 2262/0261* (2013.01); *B32B 2262/0269* (2013.01); *B32B 2262/0276* (2013.01); *B32B 2262/062* (2013.01); *B32B 2266/0207* (2013.01); *B32B 2274/00* (2013.01); *B32B 2305/022* (2013.01); *B32B 2307/306* (2013.01); *B32B 2309/02* (2013.01); *B32B 2319/00* (2013.01); *B32B 2367/00* (2013.01); *B32B 2375/00* (2013.01); *B32B 2377/00* (2013.01); *B32B 2457/00* (2013.01); *F15B 2215/305* (2013.01)

(58) Field of Classification Search
USPC .............................................. 294/208, 119.3
See application file for complete search history.

(56) References Cited

U.S. PATENT DOCUMENTS

| | | | | |
|---|---|---|---|---|
| 4,852,928 | A * | 8/1989 | Monforte | B25J 13/082 294/119.1 |
| 5,245,885 | A * | 9/1993 | Robertson | B25J 15/0009 294/119.3 |
| 5,263,753 | A * | 11/1993 | Breu | B25J 15/0206 294/196 |
| 5,385,080 | A * | 1/1995 | Suzumori | B25J 15/12 91/525 |
| 6,178,872 | B1 * | 1/2001 | Schulz | B25J 9/142 92/92 |
| 6,484,601 | B1 * | 11/2002 | Arrichiello | B25J 9/14 294/106 |
| 6,718,766 | B2 * | 4/2004 | Seto | B25J 9/142 60/476 |
| 8,651,543 | B2 * | 2/2014 | Matsuoka | B25J 15/0023 294/119.1 |
| 2005/0218679 | A1 * | 10/2005 | Yokoyama | B25J 9/142 294/99.1 |
| 2006/0028041 | A1 * | 2/2006 | Ono | B25J 9/142 294/119.3 |
| 2011/0131964 | A1 * | 6/2011 | Kocurek | E21B 33/0355 60/327 |
| 2013/0106127 | A1 * | 5/2013 | Lipson | B25J 15/0023 294/189 |
| 2014/0035306 | A1 * | 2/2014 | Garcia | B25J 15/0009 294/213 |
| 2014/0109560 | A1 | 4/2014 | Llievski et al. | |
| 2014/0114327 | A1 * | 4/2014 | Boudreaux | A61B 18/1445 606/130 |
| 2014/0314976 | A1 * | 10/2014 | Niiyama | F15B 15/103 428/34.3 |
| 2015/0090113 | A1 * | 4/2015 | Galloway | B25J 9/142 92/48 |

FOREIGN PATENT DOCUMENTS

| | | | | |
|---|---|---|---|---|
| WO | WO-2012148472 | A2 * | 11/2012 | ............ B25J 9/1075 |
| WO | WO-2012150551 | A1 * | 11/2012 | ............ B25J 9/104 |
| WO | WO-2013015503 | A1 * | 1/2013 | ............ F03G 7/065 |
| WO | WO-2013110086 | A1 * | 7/2013 | ............ B25J 9/1075 |

OTHER PUBLICATIONS

Rolf Pfeifer, Max Lungarella, and Fumiya Iida—The Challenges Ahead for Bio-Inspired 'Soft' Robotics; communications of the acm | Nov. 2012 | vol. 55 | No. 11 (Year: 2012).*
International Search Report and Written Opinion of PCT/US16/23837; dated Aug. 19, 2016; 9 pages.

* cited by examiner

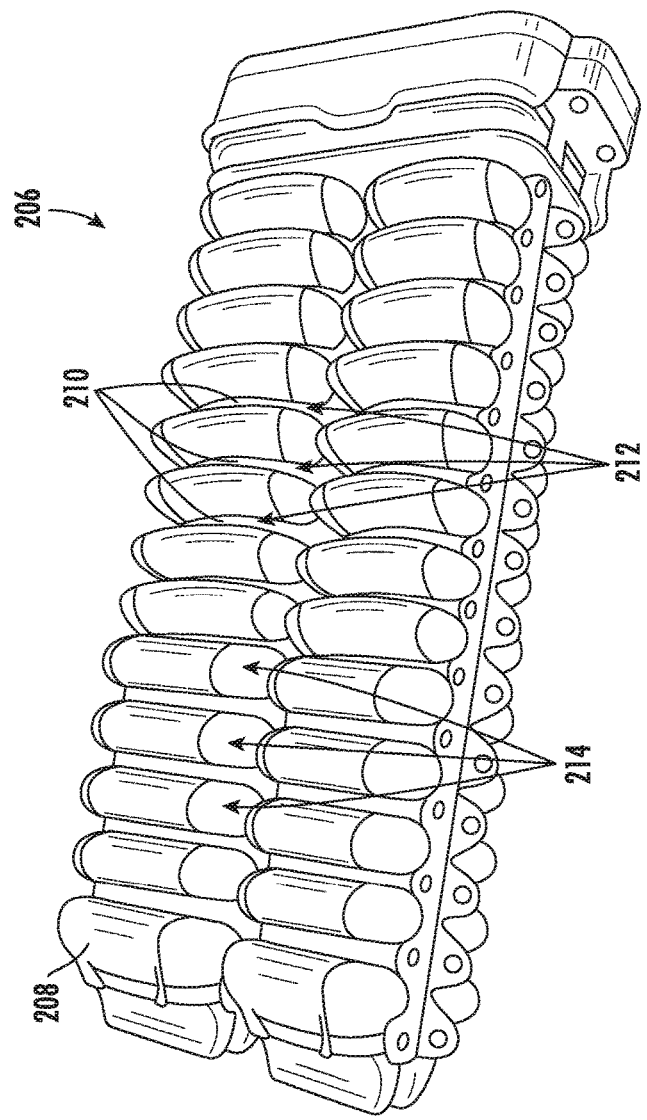

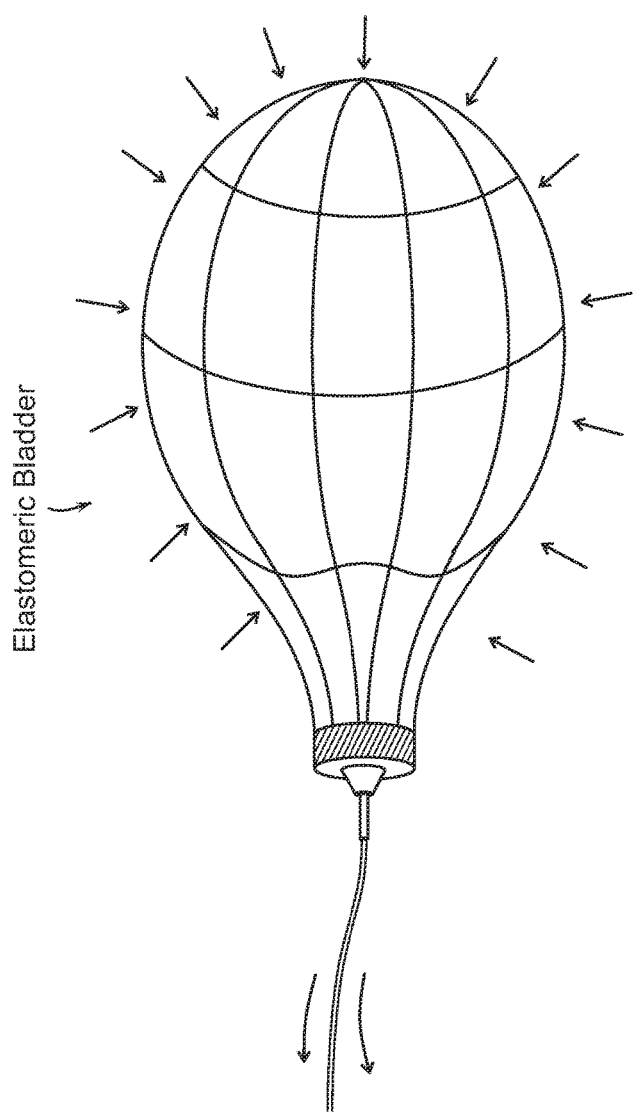

SOFT ROBOTIC ACTUATORS AND METHODS OF MANUFACTURING THE SAME

FIELD OF THE DISCLOSURE

The disclosure relates generally to the field of robotics and particularly to novel soft robotic actuators having improved rigidity, support, and grasping characteristics, and to techniques for manufacturing aspects of the improved actuators.

BACKGROUND

Robotics are used in many industries, such as manufacturing, industrial applications, medical applications, and the like. Soft robotics is a developing area of robotics that provides soft, conformal, and adaptive graspers and actuators to enable robots to interact with objects in a similar manner to a human. In particular, such robots are able to manipulate objects in the same manner as a human hand.

Traditionally, soft robotics have been employed in connection with robotic systems for grasping objects on an assembly line or in a warehouse. For example, if a part is on a shelf, a moving belt, or being moved from a shelf to a belt, an end effector may adapt to picking up the object from various directions, such as a "side pick" or a "top down pick." This same grasper may also adapt to varying objects in each task, just as the human hand can.

BRIEF DESCRIPTION OF THE DRAWINGS

FIGS. 2A-2C are perspective views depicting an exemplary rigidizing layer.

FIG. 7 is a schematic view depicting an exemplary embodiment of a hydraulic actuation system for an elastomeric bladder for driving a soft robotic actuator.

DETAILED DESCRIPTION OF THE PREFERRED EMBODIMENTS

Figure 1A:
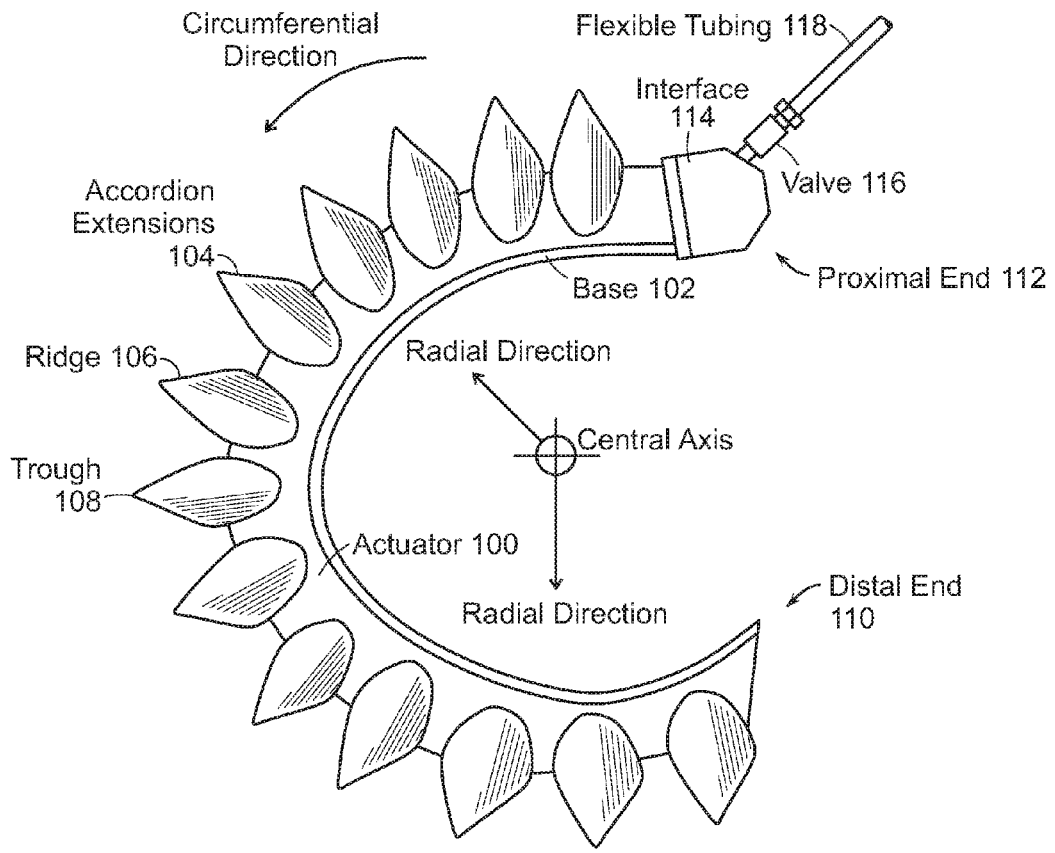
FIGS. 1A-1D depict exemplary soft robotic actuators suitable for use with exemplary embodiments described herein.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
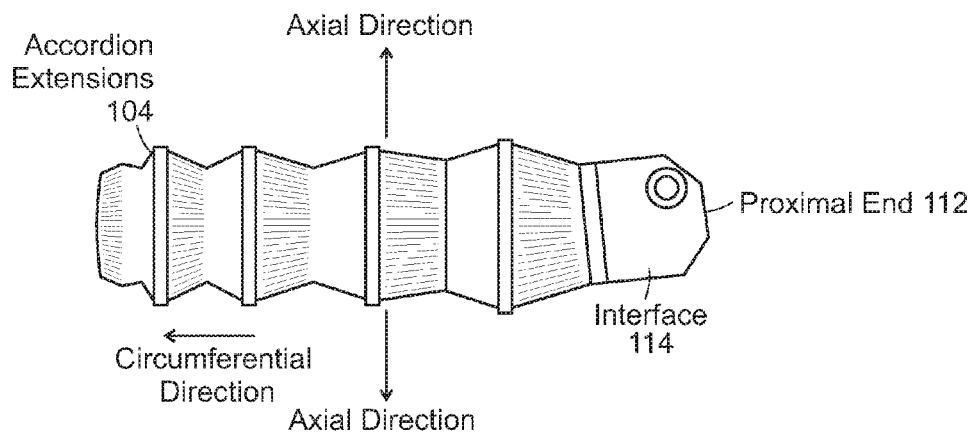
Figure 1C:
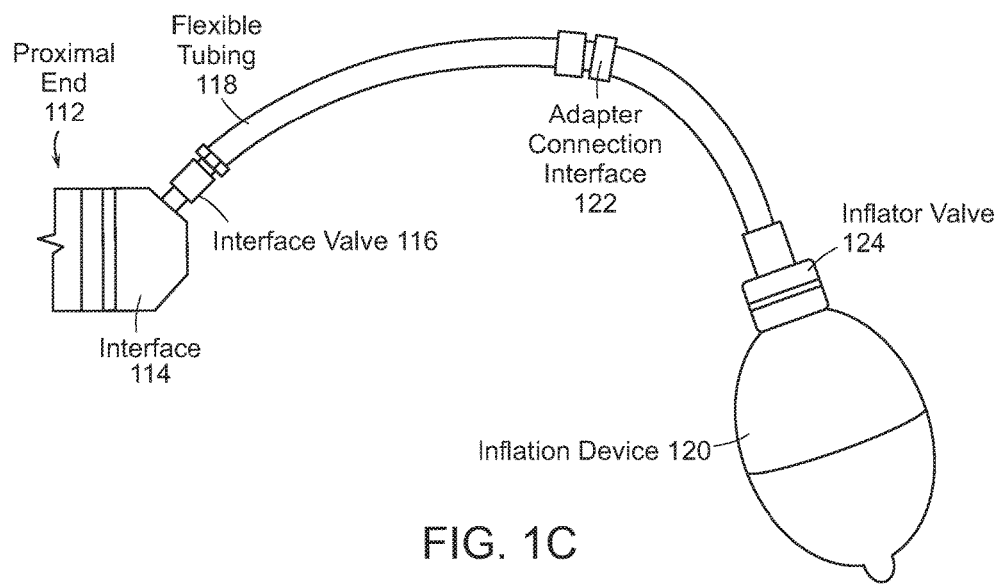
Figure 1D:
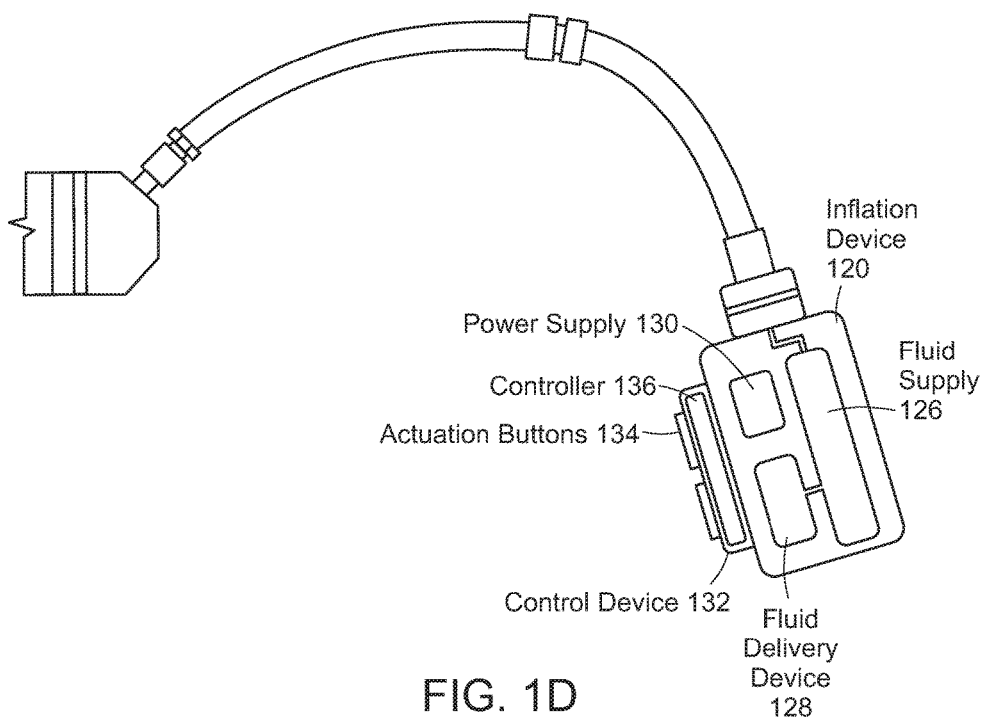

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the incision retractor. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Supporting and Rigidizing Layers, and Methods of Manufacturing the Same

Figure 2A:
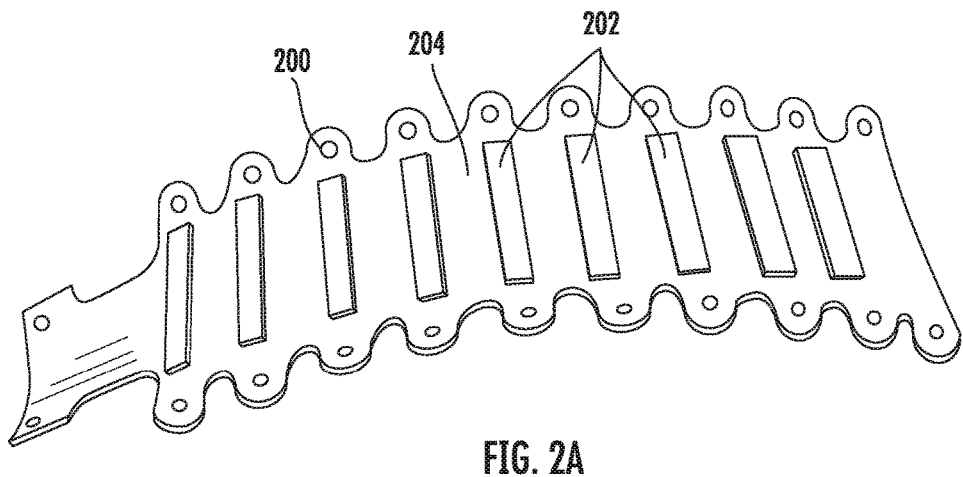

FIG. 2A depicts an exemplary rigidizing wrap or layer 200 that includes a plurality of rigid slats 202 that are affixed to a flexible backing 204 in a parallel, spaced-apart relationship. The slats 202 may be formed of any suitably rigid material, including, but not limited to, various metals, plastics, and composites.

Figure 2B:
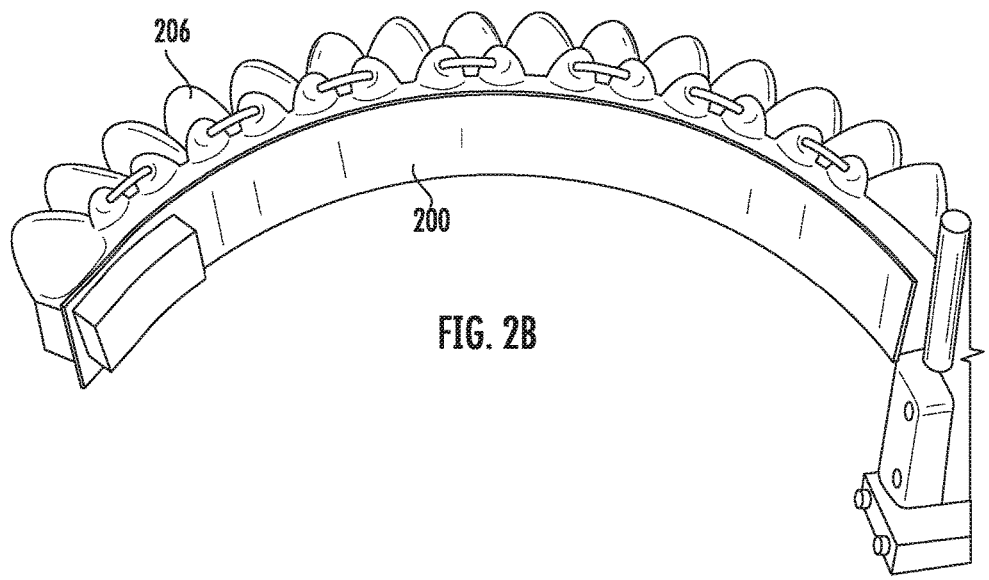

As shown in FIG. 2B, the rigidizing layer 200 can be affixed to a grasping side of an actuator 206 (the slats 202 are facing the actuator 206 and are therefore not visible in this view) using various means of attachment, such as with laces (as shown), zip ties, adhesives, mechanical fasteners, etc. In some embodiments, the flexible backing 204 can be omitted and the rigid slats 202 can be integrated into the material of the actuator 206 itself (e.g., by over-molding).

With the rigidizing layer 200 applied to the grasping side of the actuator 206 in the above-described manner, the rigid slats 202 prevent the grasping side of the actuator 206 from bulging or becoming convex when the actuator 206 is pressurized, wherein such bulging could impede the ability of the actuator 206 to bend inward in a desired manner when attempting to grasp an item. Moreover, the rigid slats 202 may prevent the grasping side of the actuator 206 from cavitating or becoming concave when a vacuum is applied to the actuator 206, wherein such cavitating could otherwise impede the ability of the actuator 206 to bend outward when attempting to open away from (e.g., ungrasp) an item. Thus, it will be appreciated that the rigidizing layer 200 may mitigate isotropic deformation of the actuator 206 during use while promoting anisotropic deformation such that pressurization of the actuator 206 may cause the actuator 206 to bend in a desired manner without significant resistance. This facilitates efficient operation of the actuator 206, since pressure that might otherwise be directed toward deforming the actuator 206 in an undesirable manner (e.g., convex bulging of the grasping side of the actuator 206) is instead directed toward deforming the actuator 206 in a desired manner. Still further, the rigidizing layer 200 may support and reduce strain on the elastomeric material of actuator 206 during operation, and may thereby mitigate the undesirable effects of hysteresis on the elastomeric material when the actuator 206 is repeatedly pressurized and depressurized. It may also improve resistance to cyclic fatigue of the elastomer at reinforced positions.

Since the rigid slats 202 are spaced apart from one another and are oriented perpendicular to the directions in which the actuator 206 bends during operation, the rigid slats 202 do not impede or interfere with the regular operation of the actuator 206 (i.e., they do not impede or interfere with bending of the actuator to grip an item, for example).

Rigidizing layers are described in more detail in U.S. patent application Ser. No. 14/944,999, entitled "Soft Robotic Actuator Enhancements" and filed on Nov. 18, 2015.

Referring to FIG. 2C, an embodiment of the actuator 206 is shown wherein a supportive layer 208 formed of a compliant material, such as neoprene foam, is disposed on a top, non-grasping side of the actuator 206, and wherein the above-described rigidizing layer 200 (not within view in FIG. 2C) and the supportive layer 208 are fastened to the actuator 206 by substantially non-extensible fastening means 210 (e.g., zip ties) that extend laterally over the trough portions 212 of the non-grasping side of the actuator 206. In addition to providing fastening means for the rigidizing layer 200, the fastening means 210 may provide the trough portions 212 with support in substantially the same manner that the rigid slats 202 provide the grasping side of the actuator 206 with support as described above. Particularly, the fastening means 210 may mitigate bulging and other undesirable deformation of the trough portions 212 during operation of the actuator 206 in order to facilitate efficient, anisotropic deformation of the actuator 206 in a desired manner, and to reduce cyclic fatigue by reducing strain at reinforced locations. The supportive layer 208 may similarly, though to a lesser degree, support the ridge portions 214 of the non-grasping side of the actuator 206 to mitigate undesirable bulging or ballooning of the ridge portions 214 upon pressurization of the actuator 206. Additionally, by varying the material from which the supportive layer 208 is formed, the behavior of the actuator 206 upon pressurization can be "tuned" in a desired manner.

Referring now to FIGS. 3A-3L, a method for manufacturing an embodiment of the above-described rigidizing layer 200 with embedded rigid slats 202 using a hot pressing technique is shown. In a first step of the method shown in FIG. 3A, a protective layer 320 of PTFE fabric or similar heat-resistant, adhesion-resistant material may be disposed on a bottom plate 322 of a conventional hot press 324. The protective layer 320, will not form part of the completed rigidizing layer 200, but is merely provided to prevent the rigidizing layer 200 from adhering to the hot press 324 during manufacture. The protective layer 320, as well as subsequent layers of material that will be described below, may be accurately positioned on the bottom plate 322 in a desired manner by fitting pre-cut holes in the protective layer 320 over locating posts 326 that extend vertically from the bottom plate 322.

It is noted that, although FIGS. 3A-3L depict the manufacturing method occurring on a hot press, similar techniques are applicable to produce the rigidizing layer 200 using other forms of processing, such as roll-to-roll processing.

Figure 3A:
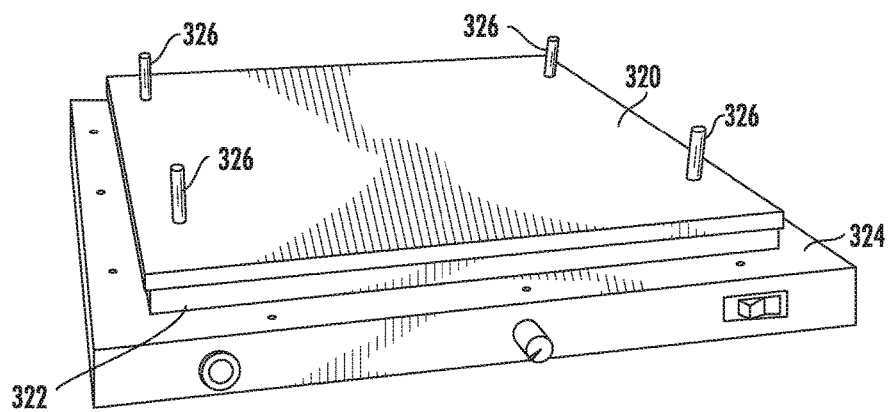
FIGS. 3A-3L are a series of views depicting an exemplary method for manufacturing the rigidizing layer shown in FIGS. 2A-2C.
Figure 3B:
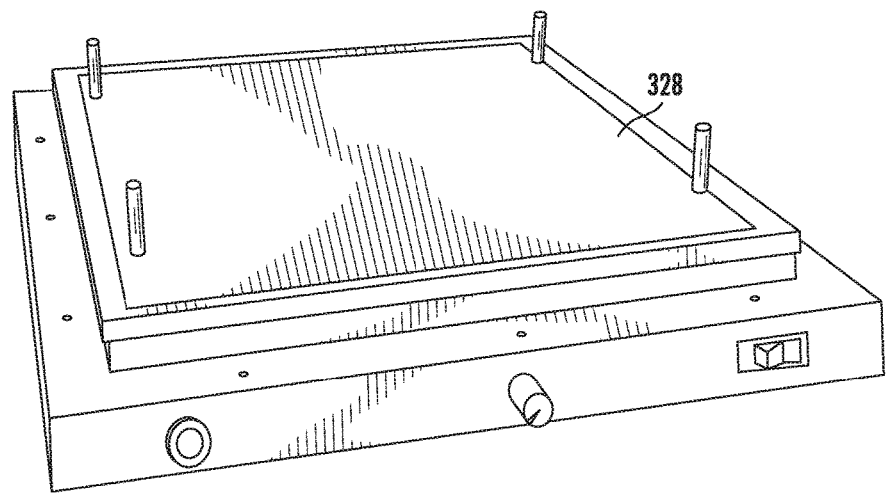

In a next step of the method shown in FIG. 3B, a fabric sheet 328 sheet, which will serve as a bottom outer layer of the rigidizing layer 200, may be disposed on top of the protective layer 320. The fabric sheet may be made of a material that can maintain its structure when heat is applied in the binding process, for example nylon, aramid fiber, or cotton.

Figure 3C:
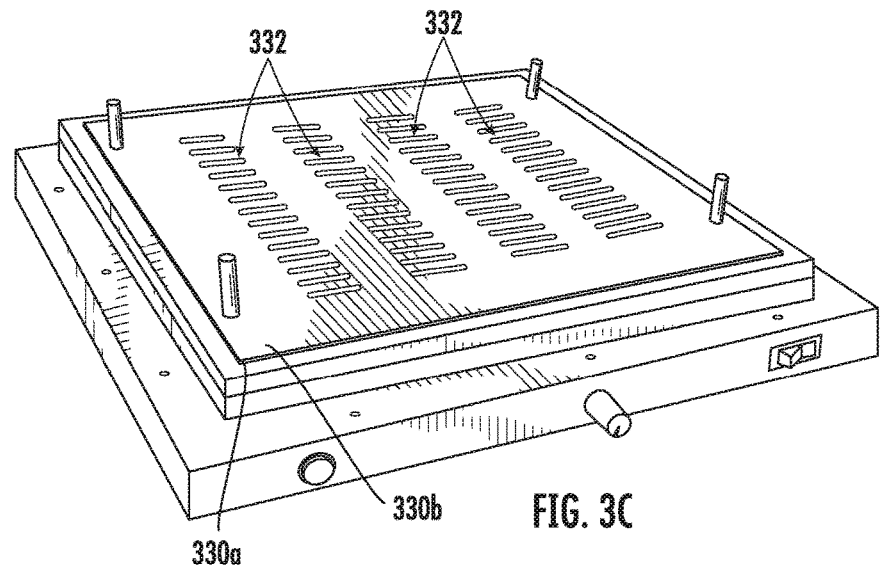

In a next step of the method shown in FIG. 3C, two sheets 330*a, b* of a binding agent, which may be a stretchable, deformable elastomer, such as a thermoplastic (e.g., thermoplastic polyurethane (TPU)), may be disposed on top of the fabric layer 328. The TPU may act as a thermal glue to bind layers and components together. Several rows of slots or cutouts 332 may be laser cut or otherwise formed in the sheets of TPU 330*a, b* for holding the accommodating the rigid slats 302 as further described below. The sheets of TPU 330*a, b* are shown as having four rows of slots 332 for forming four separate rigidizing layers. Of course, a greater or fewer number of rows of slots 332 may be provided for forming a greater or fewer number of rigidizing layers.

Figure 3D:
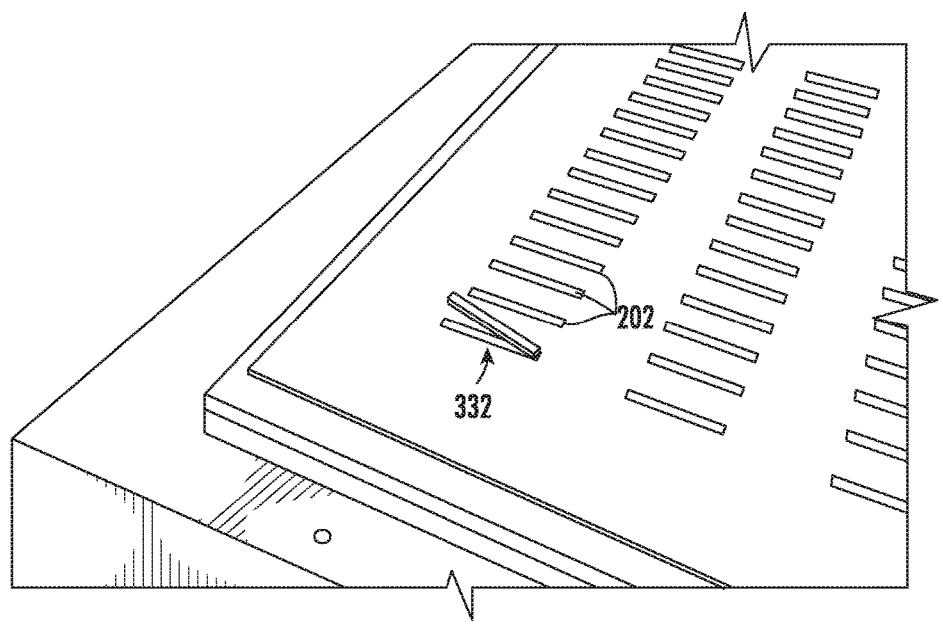

In a next step of the method shown in FIG. 3D, the rigid slats 202, which may be formed of a rigid material such as 1095 spring steel (as well as other relatively rigid plastics, metals, or composites including other forms of steel, aluminum, polyether ether ketone (PEEK), pultruded carbon fiber, etc.), may be disposed in the slots 332 of the sheets of TPU 330*a, b*.

Figure 3E:
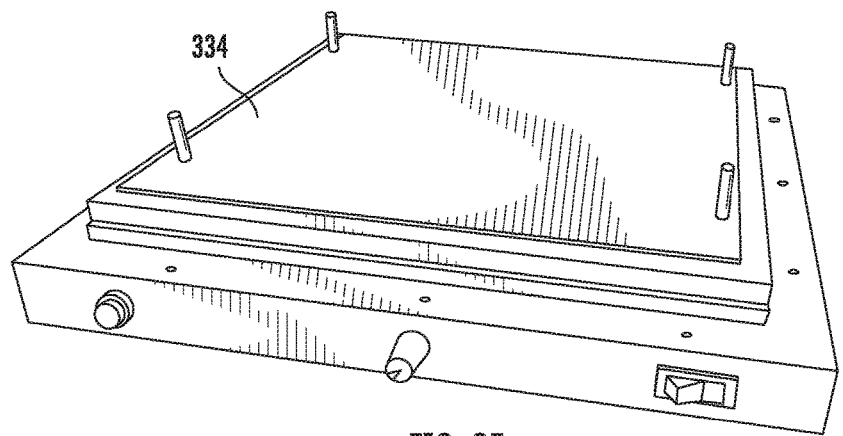

In a next step of the method shown in FIG. 3E, a sheet of spandex-covered neoprene foam 334, which will serve as a top outer layer of the rigidizing layer 200, may be disposed on top of the sheets of TPU 330a, b and the rigid slats 202. In this embodiment, the spandex-covered neoprene foam 334 conforms to the topology of the slats beneath it when the construct is heat pressed. This allows the construct to be thinner in the areas between the slats, thereby making the construct more bendable along the actuator's axis of bending. Nonetheless, any suitable deformable sheet or stretchable fabric may serve this function, including nylon, TPU-coated nylon, aramid fiber, spandex, cotton, or polyester, among other possibilities.

Figure 3F:
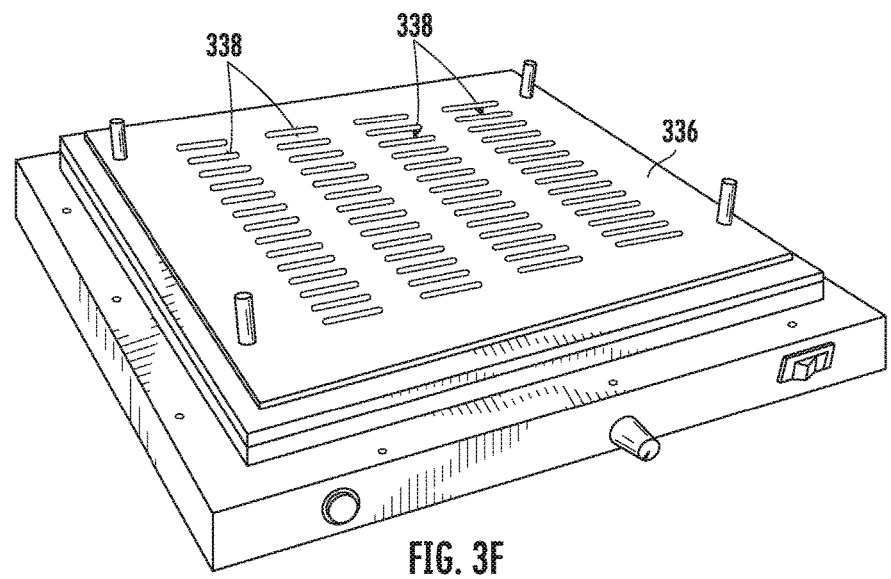

In a next step of the method shown in FIG. 3F, a gasket 336 may optionally be disposed on top of the sheet of spandex-covered neoprene foam 334. The gasket 336 may be formed of a material of suitable thickness and sturdiness to stand up to the heat of the pressing process, such as silicone or aluminum. Several rows of slots or cutouts 338 may be laser cut or otherwise formed in the silicone gasket 336 in an arrangement that is substantially identical to the slots 332 in the sheets of TPU 330a, b. The silicone gasket 336 will not form part of the completed rigidizing layer 200, but is merely provided to distribute force on the underlying layers in a desired manner during heat pressing. Particularly, when the layers of rigidizing layer 200 are heat pressed as further described below, the silicone gasket 336 may press down on all areas of the underlying layer of spandex-covered neoprene foam 334 expect for those areas that underlie the slots 338, such areas covering the rigid slats 202. Thus, when the rigidizing layer 200 is hot pressed, the areas of the spandex-covered neoprene foam 334 surrounding and intermediate the rigid slats 202 will be compressed and thinned, and will therefore not interfere with bending of the actuator 206 during operation. It should also be noted that the spandex-covered neoprene foam 334, which will abut the grasping side of the actuator 206 when installed, may protect the actuator 206 from abrasion.

Figure 3G:
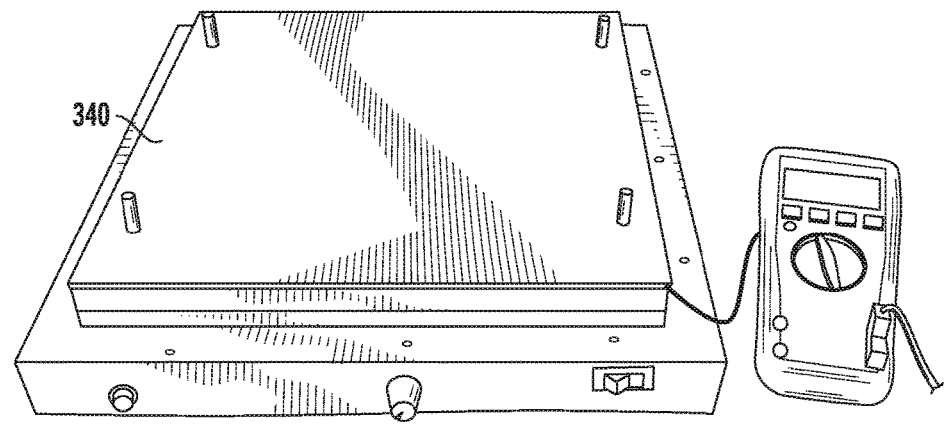

In a next step of the method shown in FIG. 3G, a protective layer 340 of PTFE fabric or similar heat-resistant, adhesion-resistant material may be disposed on top of the silicone gasket 336. The protective layer 340 will not form part of the completed rigidizing layer 200, but is merely provided to prevent the underlying layers from adhering to the hot press 324 during manufacture.

Figure 3H:
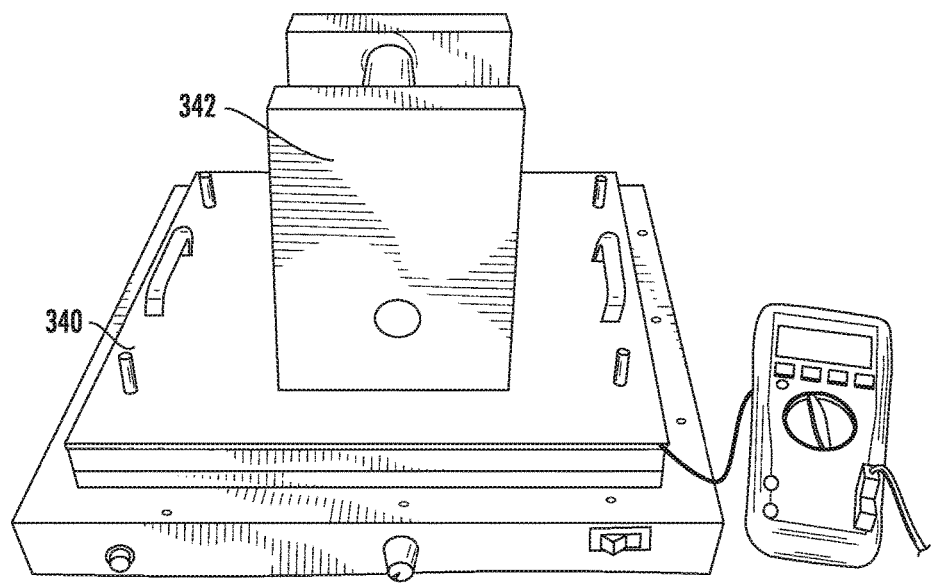

In a next step of the method shown in FIG. 3H, a top plate 342 of the hot press 324 may be placed on top of the protective layer 340, and a weight 344 may be placed on top of the top plate 342 for compressing the stacked layers of the rigidizing layer 200 to aid in even distribution of the sheets of TPU 330a, b when they are melted as further described below. This pressure may help the adhesive material (such as TPU) to flow, after which the sheets may be pressed into one another.

Figure 3I:
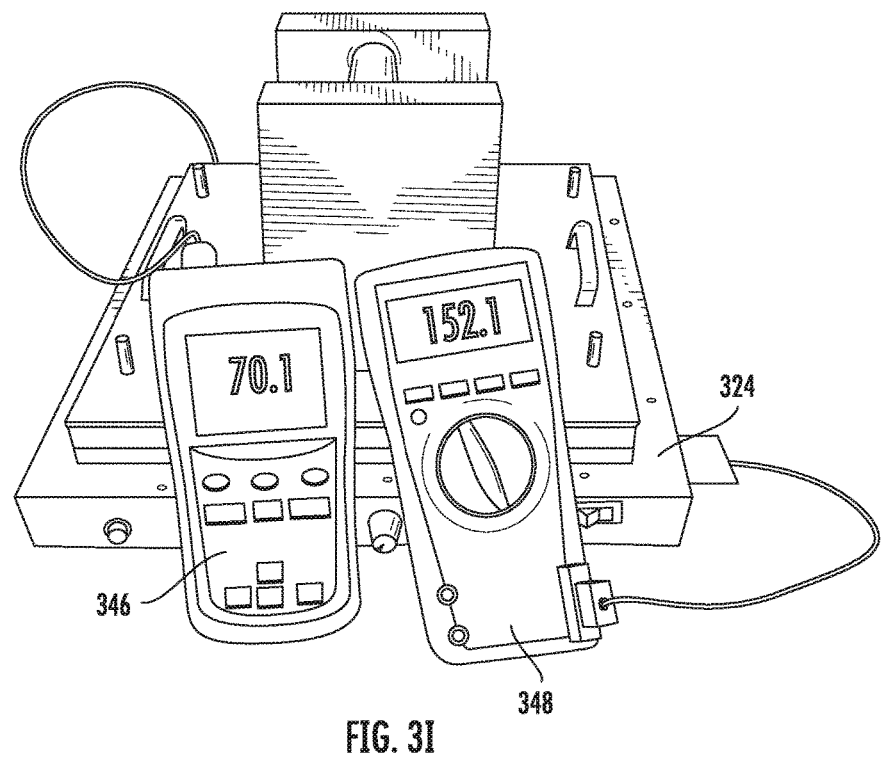

In a next step of the method shown in FIG. 3I, the hot press may be turned on, and the sheets of TPU 330a, b may be heated to a temperature that causes the sheets of TPU 330a, b to flow slightly and act as a glue. The temperature may be monitored using a first thermocouple 346 having a lead disposed adjacent the sheets of TPU 330a, b. A second thermocouple 348, having a lead disposed adjacent the top plate 342 of the hot press 324, may be used to monitor a temperature gradient (i.e., a difference between the readings of the first and second thermocouples 346, 348) in the layers of the rigidizing layer 200 to ensure that the layer of spandex-covered neoprene foam 334 does not overheat and collapse during heating, while maintaining sufficient heat in the bottom layers to allow the TPU to flow.

Figure 3J:
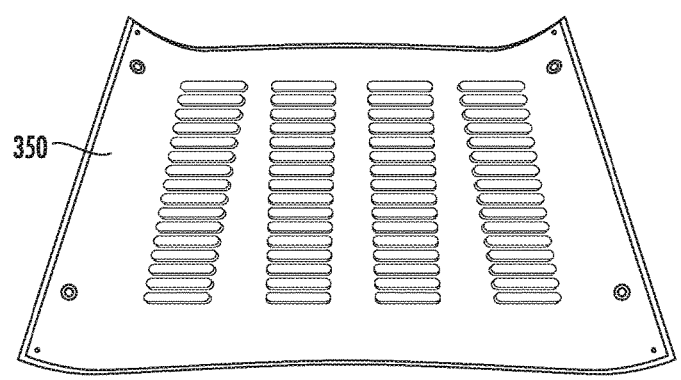
Figure 3K:
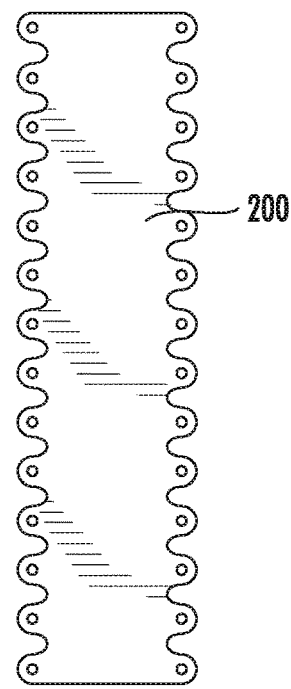
Figure 3L:
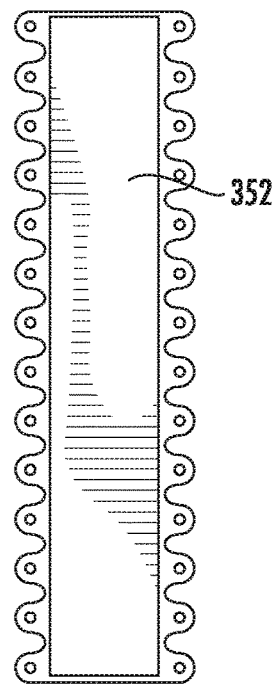

In a next step of the method shown in FIG. 3J, the completed fused sheet 350, including the sheet of nylon 328, the melted sheets of TPU 330a, b, the rigid slats 302, and the sheet of spandex-covered neoprene foam 334, may be removed from the hot press 324. In a next step of the method shown in FIG. 3K, the rigidizing layer 200 (along with 3 additional rigidizing layers) may be laser cut or otherwise cut from the fused sheet 350. In a next step of the method shown in FIG. 3L, a silicone sheet 352 may be adhered to the nylon on the grasping side of the rigidizing layer 200 for providing the rigidizing layer 200 (and ultimately the actuator 206 to which the rigidizing layer 200 will be attached) with enhanced grip when handling items. In one example, the silicone sheet 352 may be press-adhered to the grasping side of the rigidizing layer 200.

Soft Actuator with Sensors

Figure 4:
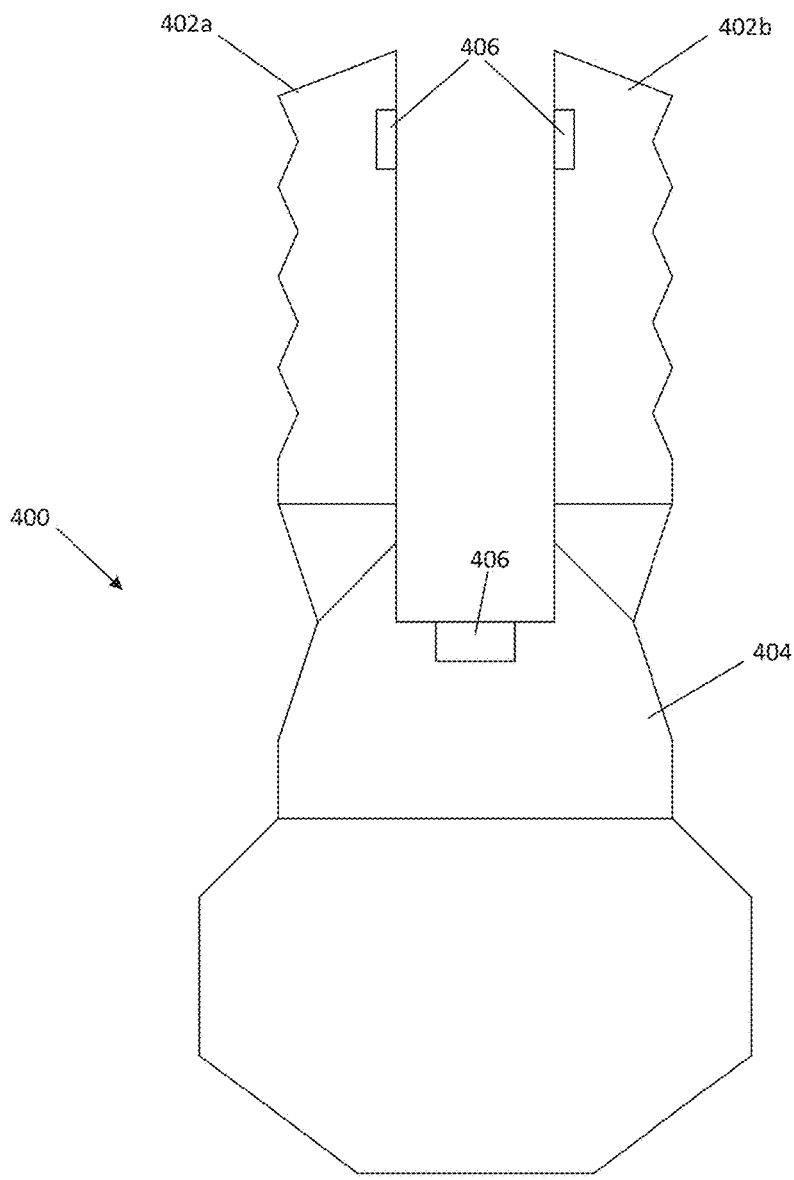
FIG. 4 is a side view depicting a soft robotic actuator assembly having a plurality of sensors for detecting and/or identifying grasped objects.

FIG. 4 depicts a soft robotic actuator assembly 400 in which a plurality of actuators 402a and 402b are mounted to a hub 404. One or more sensors 406 may be mounted to, or embedded within, one or more of the actuators 402a and 402d and the hub 3404 for detecting whether an object is in the grasp of the actuators 402a and 402d and/or for identifying what the object is. In the depicted embodiments, two sensors 406 are mounted near the distal tips of the actuators 402a, 402b, in proximity to a location at which an object is intended to be grasped by the actuators. The sensors 406 may each be of the same type, or may be of different types.

For example, one or more of the sensors 406 may be or may include a photoelectric proximity sensor for determining the presence of an object. Additionally or alternatively, one or more of the sensors 406 may be or may include an RFID reader, a QR code reader, or a barcode scanner for reading an RFID tag, QR code, or barcode of a grasped object. In another example, the sensors 406 may include a camera for positioning the assembly 400 with respect to an object to be grasped. Still further, the sensors 406 may include laser range finders, acoustic range finders, absolute pressure sensors, or vacuum sensors.

Electroadhesive Pads

Figure 5A:
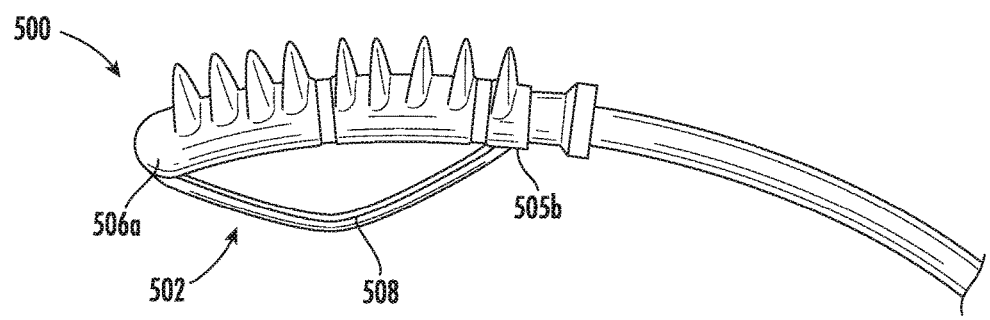
FIGS. 5A-5C are side views depicting a soft robotic actuator provided with a deformable layer for supporting an electroadhesive pad.

FIG. 5A depicts a soft robotic actuator 500 that is provided with an electroadhesive pad 502. The electroadhesive pad 502 may be a flexible, elastomeric strip that may have first and second ends 506a, b that are affixed to a grasping side of the actuator 500. The electroadhesive pad 502 may be implemented as an integral component of the actuator 500, or may be removably attached to the actuator 500, such as with mechanical fasteners. The electroadhesive pad 502 may include a plurality of embedded, interdigitated electrodes (not within view) that may be selectively energized to cause items that are brought into contact with the electroadhesive pad 502 to cling to the surface thereof.

Figure 5B:
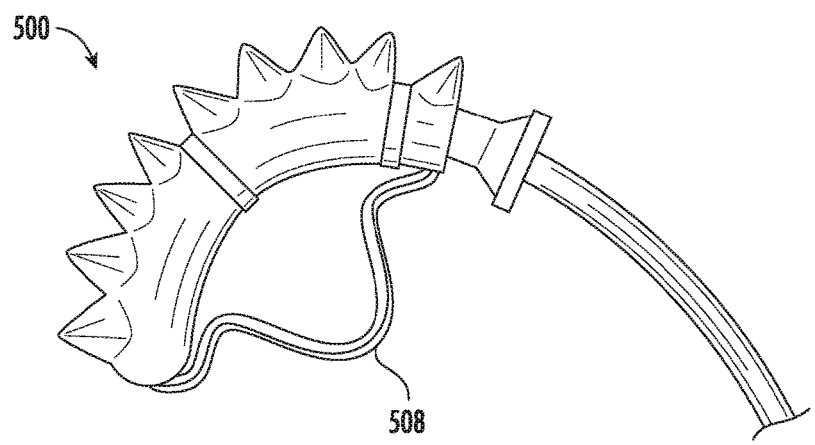
Figure 5C:
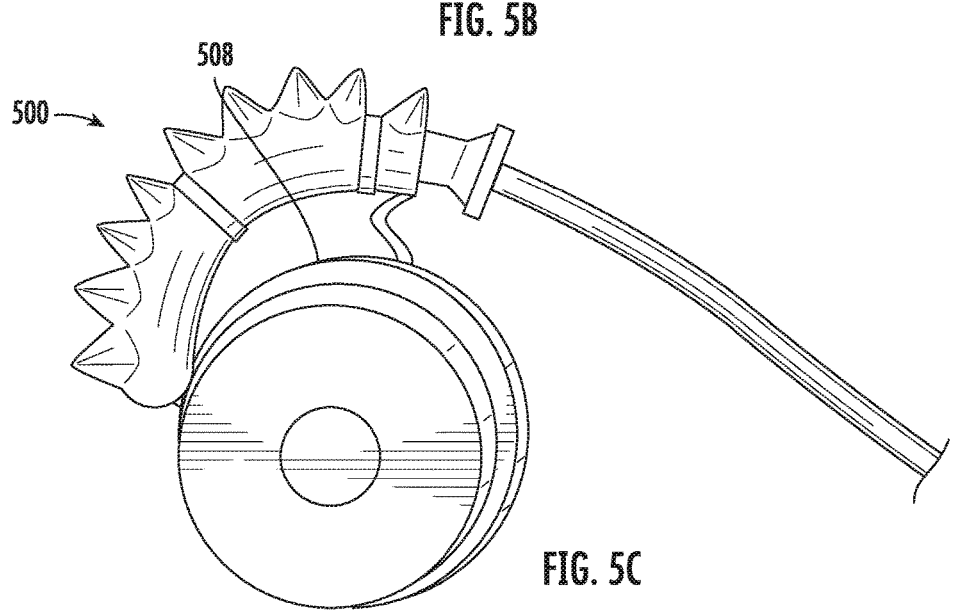

By virtue of the first and second ends 506a, b of the electroadhesive pad 502 being affixed to the grasping side of the actuator 500, and by virtue of a central portion 508 of the electroadhesive pad 502 (i.e., the portion of the electroadhesive pad 502 longitudinally intermediate the first and second ends 506a, b) not being affixed to the actuator 500, the central portion 508 of the electroadhesive pad 502 may be caused to flex and buckle away from the grasping side of the actuator 500 when the actuator 500 is actuated as shown in FIG. 5B. Since the electroadhesive pad 502 is relatively flexible, and since a rear of the electroadhesive pad 502 is unsupported when it is buckled as shown in FIG. 5B, the electroadhesive pad 502 may flex and conform to the surface of an object that is brought into contact therewith as shown in FIG. 5C. Such conformal, surface-to-surface contact is advantageous for maximizing electro-adhesion between the electroadhesive pad 502 and a gripped object.

The above-described electroadhesive pad 502 may be particularly well suited for gripping soft, delicate objects and structures without damaging them. For example, a soft robotic actuator with an electroadhesive pad may be used to grasp and manipulate human organs (e.g., lungs, bowels, stomach, intestines, etc.) during surgery. Further applications include picking up items from a tote in an order fulfillment center, placing items (such as produce) into a case for shipping, and packaging fragile items (such as chocolate candies).

Hydraulic Actuators

Many of the above-described soft robotic systems and actuators may be similarly implemented using hydraulic actuation (i.e., hydraulic pumping systems) instead of pneumatic actuation. Hydraulic pumping systems may be advantageous for driving a soft robot for at least three reasons: 1) the actuating fluid is incompressible so energy and time would not be wasted compressing the fluid volume during pressurization, 2) since the fluid is not compressible the actuation system could be small enough to mount in the hub of a soft gripper or attached to the armature (e.g. on a robotic arm or gantry system) holding the soft gripper, and 3) such systems may be ideal for under water operation, since the pressurizing fluid will be neutrally buoyant with the surrounding environment.

Currently available miniaturized diaphragm pumps exchange flow volume for form factor and high static pressures. This makes actuation fundamentally slow. An alternative class of pumps is needed for driving soft robots that create high pressure with high flow rates for very short periods of time.

Figure 6A:
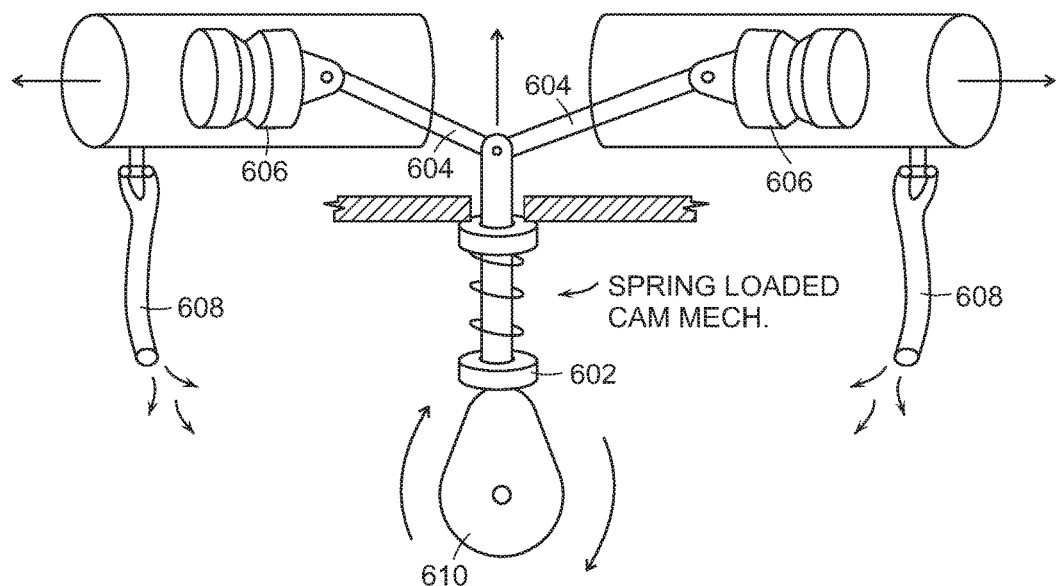
FIG. 6A is a schematic view depicting a piston pump design for driving two hydraulic soft robotic actuators

Shown in FIG. 6A is a piston pump design for driving two soft actuators (not shown). In this design, a camshaft 602 is connected to followers 604, which drive a set of pistons 606 that deliver hydraulic fluid to tubes 608 that are connected to soft actuators. The cam mechanism may be spring loaded, and the camshaft may include an oblong lobe 610 that drives the pistons 606.

Figure 6B:
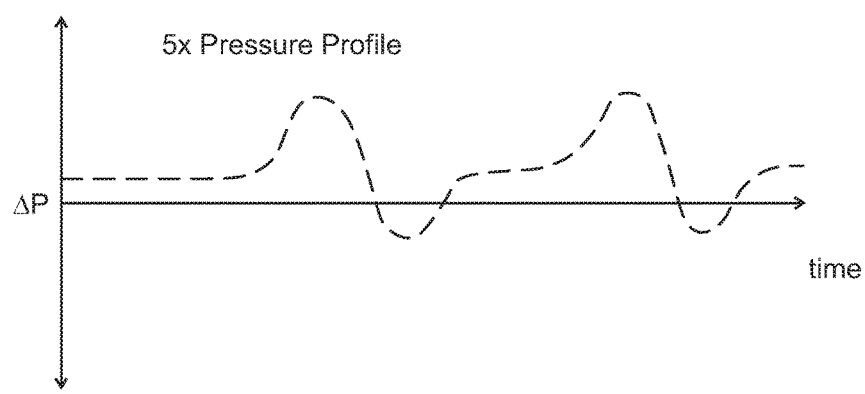
FIG. 6B is a pressure profile relating to the piston pump design of FIG. 6A.

Shown in FIG. 6B is an exemplary time dependent pressure profile generated by the pump. In this design the pressure profile delivered by an individual piston assembly can be arbitrarily set by changing the shape of the oblong lobe 610 on the camshaft.

Much like the camshaft in a car that drives a plurality of pistons, in this embodiment the camshaft may actuate a plurality of soft actuators with mechanically-programmed relative timings. For example, one could generate a scrambling gate for a legged soft robot by driving two sets of soft actuators 180 degrees out of phase from one another, via a connection to two sets of oblong lobes 610 on the camshaft that are also 180 degrees out of phase.

A soft actuator could also be driven by compressing an attached elastomeric bladder filled with hydraulic fluid. This bladder may be molded such that it is part of the soft actuator or it may be cast as a separate part and attached to the soft actuator. The actuation may be achieved by compressing the bladder by hand, by a mechanical device (e.g. a lever) or by an electromechanical system.

FIG. 7 shows an exemplary embodiment of an actuation system for an elastomeric bladder that drives a soft actuator. Here, the bladder is covered in a shape memory alloy such as nitinol mesh that contracts upon exposure to heat (e.g., due to resistive heating from passing a current through an attached wire, or due to other changes in temperature, such as an adjustment to the ambient temperature). This contraction drives fluid out of the bladder and into a soft actuator which may be attached to the flange, shown on the right.

It should be noted that this bladder need not be elastomeric. For example, the bladder may be made from a plastic molded in the shape of an accordion bellows, among other possibilities. A plastic bladder would be advantageous when building a single device that consists of a plastic soft actuator that is connected to a plastic actuation bladder.

Figure 8:
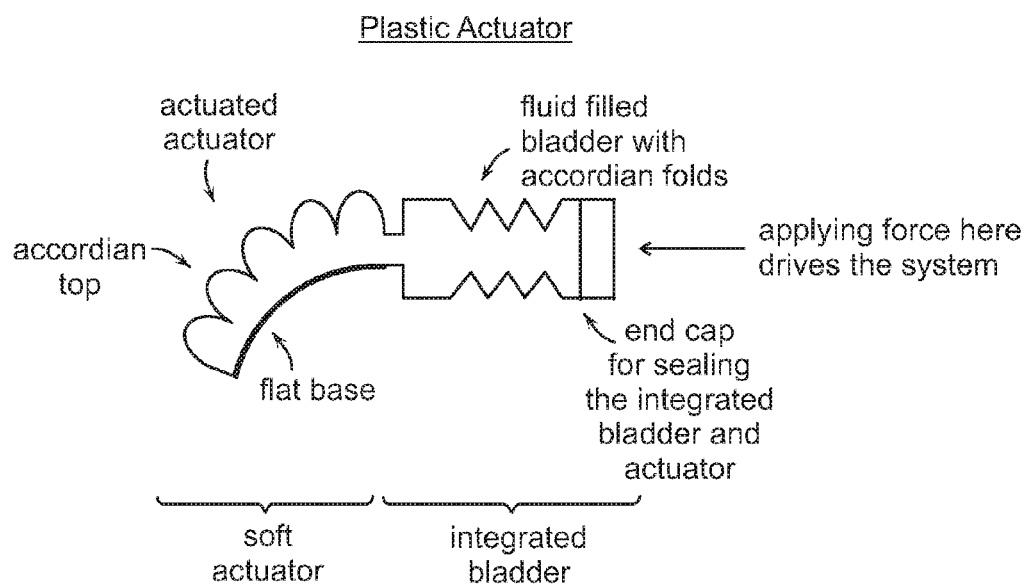
FIG. 8 is a schematic view depicting a blow moldable plastic hydraulic actuator with an integrated actuation bladder.

For example, shown in FIG. 8 is an illustration of a blow moldable plastic actuator with integrated actuation bladder. Here one would press on the plastic end cap shown on the right in order to drive fluid out of the bellows and into the actuator. Since this device is made out of a plastic instead of an elastomer the return force for de-actuating the system may be provided by a return spring attached to, or inside, the accordion bladder or the bellows (not shown).

Figure 9:
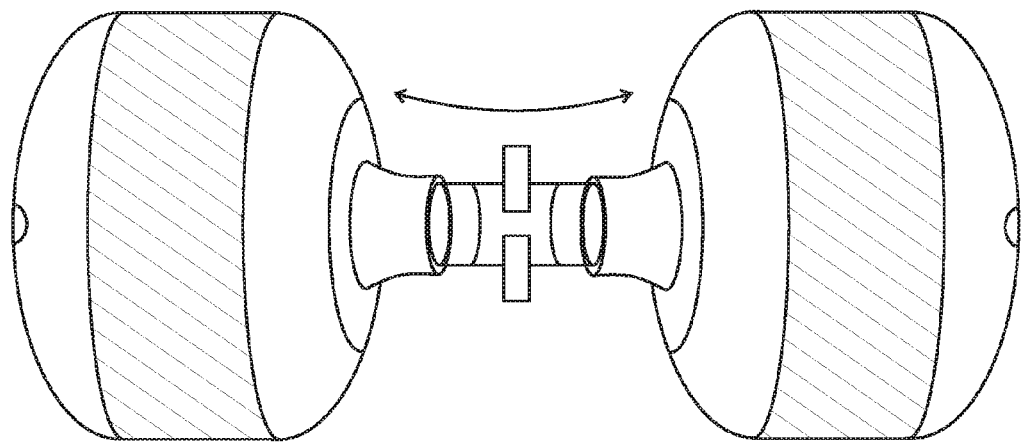
FIG. 9 is a schematic view depicting a hydraulic pressurization system in which a single piston may actuate two devices 180 degrees out of phase from one another.

A pressurization system could also be built such that a single piston could actuate two devices 180 degrees out of phase from one another, for example for driving a legged robot. Shown in FIG. 9 is an exemplary embodiment of such a pumping system. Here a linear shaft, depicted as a horizontal dotted line, drives a piston to the left and right of a cylinder that is connect to two elastomeric bladders. These bladders are radially constrained (shown as a shaded band surrounding each bladder) such that upon pressurization only one face of a bladder can expand. These bladders may be connected to soft actuators; accordingly, when a bladder expands it compresses the fluid in the actuator, thereby driving its actuation.

The 180 degree phase shift between the sides of the pump is achieved by placing the two bladders on opposite sides of the cylinder containing the piston. As a result, when one side of the system is pressurized the other side of the system is depressurized. It should be noted that although this system is shown with equal sized bladders on either side of the piston assembly one could use bladders of different sizes on either end in order to create a pump that runs two sets of actuators at different pressures.

Figure 10:
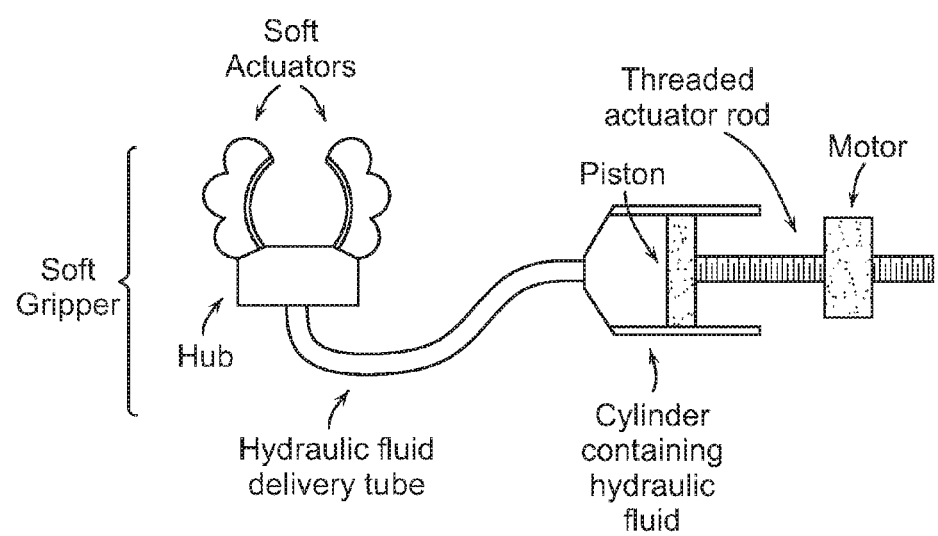
FIG. 10 is a schematic view depicting a soft robotic gripper connected a hydraulic fluid pump that is driven by a linear actuator.

A linear actuator could also be used to pump hydraulic fluid. FIG. 10 shows a soft gripper that is connected to such a pressurization system. Here hydraulic fluid, located in the cylinder on the right, is transmitted via a delivery tube to a soft gripper when a piston in the cylinder is driven forward by a linear actuator. In this exemplary embodiment the linear actuator consists of a motor that drives a threaded rod which is connected to the piston, though other kinds of linear actuators would also be suitable.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the present invention has been disclosed with reference to certain embodiments, numerous modifications, alterations and changes to the described embodiments are possible without departing from the sphere and scope of the present invention, as defined in the appended claim(s). Accordingly, it is intended that the present invention not be limited to the described embodiments, but that it has the full scope defined by the language of the following claims, and equivalents thereof.

The invention claimed is:

1. A rigidizing layer for a soft robotic actuator, the rigidizing layer formed by:

disposing a fabric sheet on a bottom plate of a hot press;
disposing a layer of thermoplastic material on the fabric sheet, the layer of thermoplastic material having a plurality of slots formed in it;
disposing a rigid slat in each of the slots in the layer of thermoplastic material;
disposing a compliant supportive layer on the layer of thermoplastic material and the slats;
disposing a top plate of the hot press on the compliant supportive layer;
operating the hot press to bond the fabric sheet, the layer of thermoplastic material, and the compliant supportive layer together to form a bonded sheet; and
cutting the rigidizing layer from the bonded sheet.

2. The rigidizing layer of claim 1, wherein the fabric sheet comprises nylon.

3. The rigidizing layer of claim 1, wherein the thermoplastic material comprises thermoplastic polyurethane (TPU).

4. The rigidizing layer of claim 1, further comprising disposing a gasket on the compliant supportive layer, the gasket having a number and arrangement of slots formed in corresponding to a number and configuration of the slots formed in the layer of thermoplastic material.

5. The rigidizing layer of claim 1, wherein the compliant supportive layer comprises a stretching foam.

6. The rigidizing layer of claim 1, wherein the compliant supportive layer comprises spandex and neoprene foam.

7. A soft robotic actuator assembly comprising:
a soft robotic actuator comprising a plurality of accordion extensions extending outwards in a radial direction;
a camshaft connected to a first end of a follower;
a piston, connected to a second end of the follower, wherein the follower and the camshaft drive the piston, for supplying hydraulic fluid to a tube connected to the soft actuator to pressurize the soft actuator; and
an oblong lobe connected to the camshaft, wherein a pressure profile delivered by the piston is a function of a shape of the oblong lobe.

8. The assembly of claim 7, further comprising a set of hydraulically-actuated soft actuators that are driven out of phase from one another by the action of a single piston chamber.

9. The assembly of claim 7, wherein the piston is controlled by a linear actuator.

* * * * *